(12) United States Patent
Damnjanovic et al.

(10) Patent No.: US 8,503,373 B2
(45) Date of Patent: Aug. 6, 2013

(54) LOCALIZED AND DISTRIBUTED ALLOCATION MULTIPLEXING AND CONTROL

(75) Inventors: Jelena M. Damnjanovic, Del Mar, CA (US); Durga Prasad Malladi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 635 days.

(21) Appl. No.: 11/622,932

(22) Filed: Jan. 12, 2007

(65) Prior Publication Data

US 2007/0165568 A1    Jul. 19, 2007

Related U.S. Application Data

(60) Provisional application No. 60/759,149, filed on Jan. 13, 2006.

(51) Int. Cl.
*H04W 4/00* (2009.01)
(52) U.S. Cl.
USPC ........... 370/329; 370/343; 370/431; 370/432; 370/433; 370/434; 370/435; 370/436; 370/437; 370/443; 370/462; 370/341; 370/348; 370/537; 455/17; 455/45; 455/59; 455/61
(58) Field of Classification Search
USPC ......... 370/341, 343, 348, 537, 329, 431–437, 370/462; 455/17, 45, 59, 61
See application file for complete search history.

(56) References Cited

U.S. PATENT DOCUMENTS

| | | | |
|---|---|---|---|
| 6,259,686 B1 * | 7/2001 | Blanc et al. | 370/337 |
| 7,050,406 B2 * | 5/2006 | Hsu et al. | 370/320 |
| 7,146,172 B2 | 12/2006 | Li et al. | |
| 7,260,399 B1 * | 8/2007 | Oh et al. | 455/436 |
| 2001/0030956 A1 * | 10/2001 | Chillariga et al. | 370/348 |
| 2004/0008614 A1 * | 1/2004 | Matsuoka et al. | 370/203 |
| 2004/0264592 A1 * | 12/2004 | Sibecas et al. | 375/267 |
| 2005/0025039 A1 * | 2/2005 | Hwang et al. | 370/206 |
| 2005/0047335 A1 * | 3/2005 | Cheng et al. | 370/229 |
| 2005/0078616 A1 | 4/2005 | Nevo et al. | |
| 2005/0111429 A1 | 5/2005 | Kim et al. | |
| 2005/0180354 A1 * | 8/2005 | Cho et al. | 370/328 |
| 2005/0232193 A1 | 10/2005 | Jorgensen | |
| 2006/0013185 A1 * | 1/2006 | Seo et al. | 370/343 |
| 2007/0097915 A1 * | 5/2007 | Papasakellariou | 370/329 |

(Continued)

FOREIGN PATENT DOCUMENTS

| | | |
|---|---|---|
| EP | 1613117 A2 | 1/2006 |
| RU | 2358390 | 10/2005 |
| RU | 2264036 | 11/2005 |
| RU | 2005116255 | 11/2005 |

OTHER PUBLICATIONS

Downlink Multiplexing for EUTRA (3GPP TSG-RAN WG1 Meeting $42 bis), Oct. 2005.*

(Continued)

*Primary Examiner* — Charles Appiah
*Assistant Examiner* — Edward Zhang

(57) ABSTRACT

Systems and methodologies are described that facilitate multiplexing of localized transmissions and distributed transmissions to reduce overhead transmission costs. According to various aspects, systems and/or methods are described that enable selection of an optimal transmission scheme in order to accommodate various traffic services, user abilities and channel properties.

48 Claims, 12 Drawing Sheets

U.S. PATENT DOCUMENTS

2007/0140402 A1    6/2007   Baliga
2007/0149249 A1*   6/2007   Chen et al. .................... 455/561
2007/0242636 A1*  10/2007   Kashima et al. ............. 370/329
2009/0129334 A1*   5/2009   Ma et al. ....................... 370/331

OTHER PUBLICATIONS

3GPP TR 25.814 v0.5.0; "3rd Generation Partnership Project; Technical Specification Group Radio Access Network; Physical Layer Aspects for Evolved UTRA," 3GPP TR 25.814 version 0.5.0 Release 7 (Nov. 2005).

Declaration of Non-Establishment of International Search Report-PCT/US2007/060516, International Searching Authority-European Patent Office—Jul. 20, 2007.
Written Opinion—PCT/US2007/060516, International Searching Authority-European Patent Office Jul. 20, 2007.
Taiwan Search Report—TW096101340 TIPO—Oct. 8, 2008.
Siemens "Distributed resource allocation for OFDMA", 3GPP TSG RAN WG1#43, R1-051418, Nov. 7, 2005.
Sylvestre et al.,"A study on frequency domain scheduling considering Quality of Service for OFDM Adaptive Modulation Systems,"IDICE Tec.Rep., Feb. 23, 2005, RCS2004-340,vol. 104. No. 678.pp. 95-100.

* cited by examiner

LOCALIZED AND DISTRIBUTED ALLOCATION MULTIPLEXING AND CONTROL

CROSS-REFERENCE TO RELATED APPLICATION

This application claims the benefit of U.S. provisional application Ser. No. 60/759,149, filed on Jan. 13, 2006, and entitled LOCALIZED AND DISTRIBUTED ALLOCATION MULTIPLEXING AND CONTROL. The entirety of this application is incorporated herein by reference.

BACKGROUND

1. Field

The following description relates generally to wireless communications, and more particularly to multiplexing schemes that can support flexible multiplexing of localized and distributed allocations.

2. Background

Wireless communication systems have become a prevalent means by which a majority of people worldwide have come to communicate. Wireless communication devices have become smaller and more powerful in order to meet consumer needs, improve portability and convenience. The increase in processing power in mobile devices such as cellular telephones has lead to an increase in demands on wireless network transmission systems.

A typical wireless communication network (e.g., employing frequency, time, and code division techniques) includes one or more base stations that provide a coverage area and one or more mobile (e.g., wireless) terminals that can transmit and receive data within the coverage area. A typical base station can concurrently transmit multiple data streams for broadcast, multicast, and/or unicast services, wherein a data stream is a stream of data that can be of independent reception interest to a mobile terminal. A mobile terminal within the coverage area of that base station can be interested in receiving one, more than one or all the data streams carried by the composite stream. Likewise, a mobile terminal can transmit data to the base station or another mobile terminal.

For downlink transmission, either localized (e.g. blockwise) transmission or distributed (e.g. scattered) transmission can be employed. Localized transmission is beneficial because it allows for frequency selective scheduling. Distributed transmission, on the other hand, makes use of frequency diversity and is useful for high-speed users. A need exists for optimizing the type of transmission that is employed while also allowing for a reduction in the number of bits that are transmitted during the downlink transmission.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance an aspect, a communications methodology, comprises: receiving information regarding access terminal capabilities; and multiplexing localized and distributed transmissions to the access terminal as a function of the capabilities.

In another aspect, an apparatus, comprises: a memory for storing information; a processor that executes instructions; and an optimization component that receives information regarding access terminal capabilities, and multiplexes localized and distributed transmissions to the access terminal as a function of the capabilities.

According to another aspect, a computer readable medium has stored thereon computer executable instructions for performing the following acts: receiving information regarding access terminal capabilities; and multiplexing localized and distributed transmissions to the access terminal as a function of the capabilities.

In another aspect, a processor has stored thereon computer executable instructions for performing the following acts: receiving information regarding access terminal capabilities; and multiplexing localized and distributed transmissions to the access terminal as a function of the capabilities.

In yet still another aspect, a system, comprises: means receiving information regarding access terminal capabilities; and means multiplexing localized and distributed transmissions to the access terminal as a function of the capabilities.

To the accomplishment of the foregoing and related ends, the one or more aspects comprise the features hereinafter fully described and particularly pointed out in the claims. The following description and the annexed drawings set forth in detail certain illustrative aspects of the one or more aspects. These aspects are indicative, however, of but a few of the various ways in which the principles of various aspects may be employed and the described aspects are intended to include all such aspects and their equivalents.

DETAILED DESCRIPTION

Figure 1:
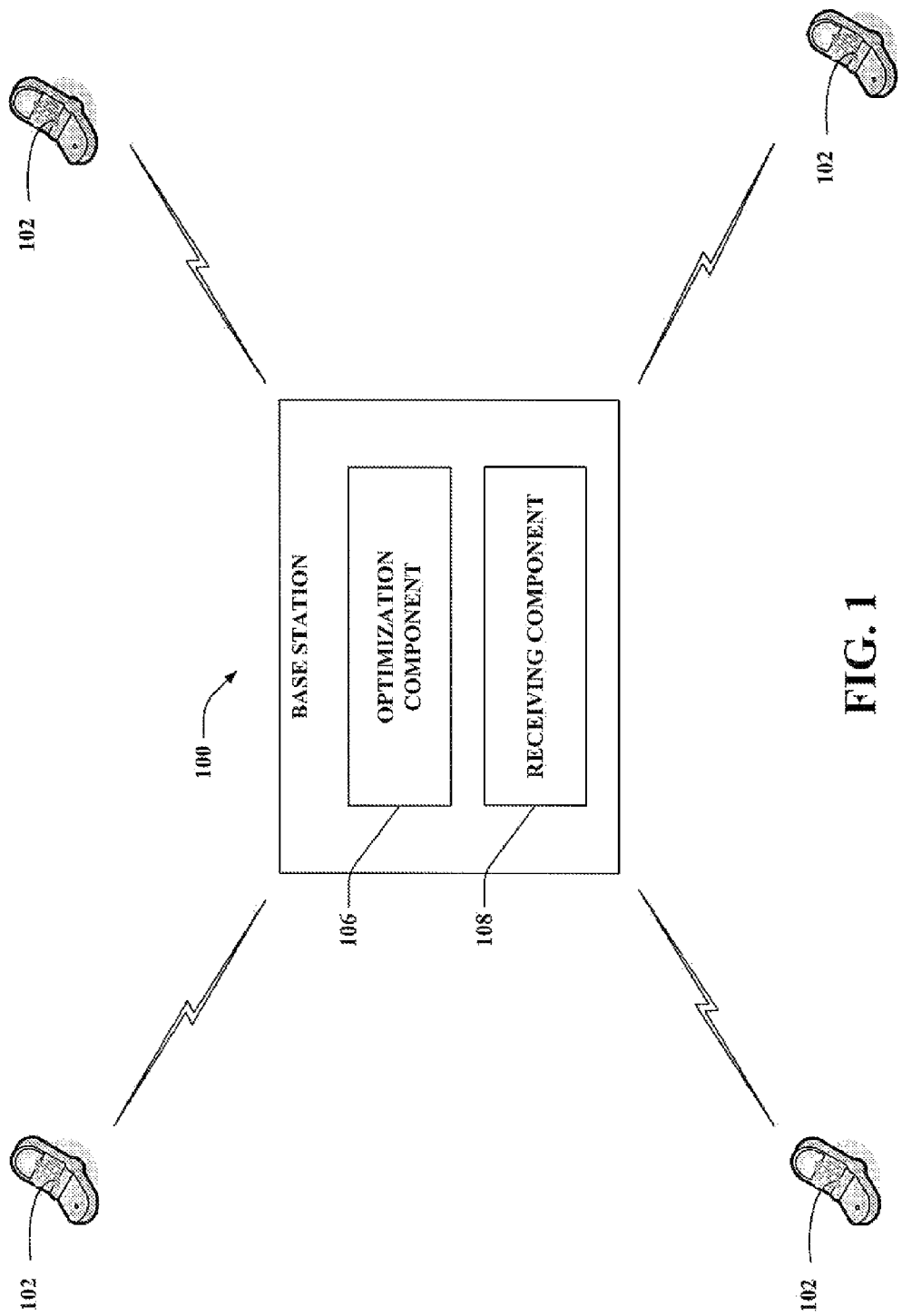
FIG. 1 is an illustration of an example system that effectuates optimal downlink transmission in a wireless communication environment.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

As used in this application, the terms "component," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Furthermore, various embodiments are described herein in connection with a mobile device. A mobile device can also be called a system, subscriber unit, subscriber station, mobile station, mobile, remote station, remote terminal, access terminal, user terminal, terminal, wireless communication device, user agent, user device, or user equipment (UE). A mobile device may be a cellular telephone, a cordless telephone, a Session Initiation Protocol (SIP) phone, a wireless local loop (WLL) station, a personal digital assistant (PDA), a handheld device having wireless connection capability, computing device, or other processing device connected to a wireless modem. Moreover, various embodiments are described herein in connection with a base station. A base station may be utilized for communicating with mobile device(s) and may also be referred to as an access point, Node B, or some other terminology.

Moreover, various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

Referring now to FIG. 1, a system 100 that effectuates optimal downlink transmission in a wireless communication environment is illustrated in accordance with various embodiments herein. Base station 102 is configured to communicate with one or more mobile devices 104. Base station 102 is comprised of an optimization component 106 that allows for multiplexing of localized and distributed transmissions, and a receiving component 108 that, for example, receives information regarding base station capabilities. Optimization component 106 allows for downlink transmission such that frequency diversity is achieved and overhead costs associated with the transmission are mitigated via various schemes, as discussed infra. As can be appreciated, multiplexing of localized and distributed transmissions allows for accommodation of various traffic services, user abilities and further allows a user of the one or more mobile devices 104 to take advantage of channel properties. Moreover, for example, the one or more mobile devices 106 can provide the optimization component 106 at the base station 102 with information related to mobile device capabilities, an estimate of downlink channel conditions, and subscriber data. It is also to be appreciated that the base station 102 can determine a percentage of high speed versus low speed users, store subscriber data and information related to mobile device capabilities. Such capabilities of base station 102 can further allow optimization component 108 to choose the optimal multiplexing scheme according to surrounding conditions.

Figure 2:
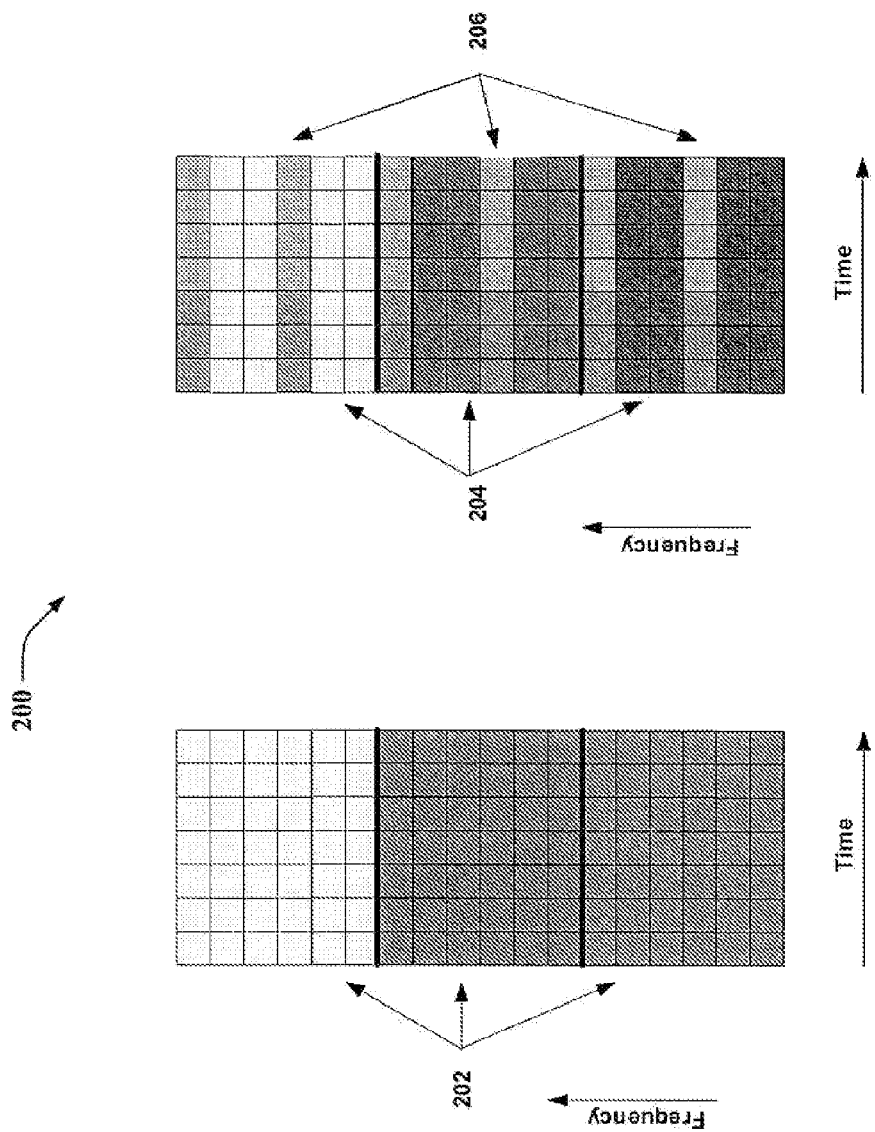
FIG. 2 is an illustration of an example transmission scheme within a wireless communications environment.

With reference now to FIG. 2, a scheme that optimizes downlink transmission via multiplexing of localized transmission and distributed transmission is illustrated. At 202, a frequency band is shown that is divided into three fixed localized subbands. It is to be appreciated that that the foregoing example is illustrative in nature and is not intended to limit the number of localized subbands that can be made with the various embodiments and/or methods described herein. At 204, the three localized subbands as previously discussed are shown after distributed allocation of the subcarriers has taken place. More particularly, distributed allocation is done as needed amongst the subcarriers 206 within the localized subbands 204.

With further reference to FIG. 2, the illustrated multiplexing scheme provides for optimized frequency diversity by notifying all scheduled users of their sub-carrier allocation in addition to signaling the scheduled users of the portion of the resources that have been allocated to distributed allocation users. In the embodiment illustrated in FIG. 2, regardless of the number of distributed allocations that are present, the number of localized subbands that make up the frequency band remains constant.

Figure 3:
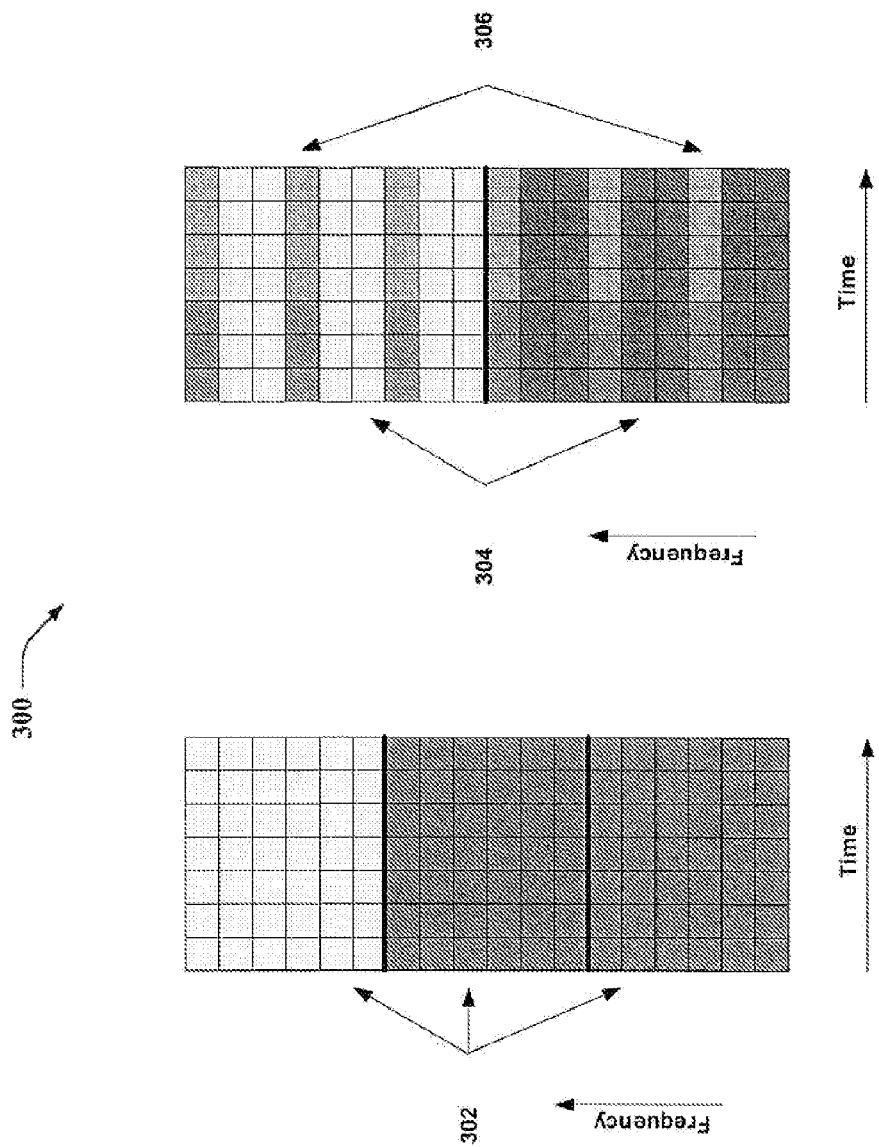
FIG. 3 is another illustration of an example transmission scheme within a wireless communications environment.

With reference now to FIG. 3, a multiplexing scheme 300 is illustrated. As an example, three localized subbands 302 are shown prior to distributed allocation of resources within the localized subbands occurs. In this embodiment, multiplexing is accomplished by reducing the number of localized subbands 304 in the whole frequency band rather than reducing the number of subcarriers 306 as distributed allocation of resources increases. In this way, overhead costs associated with uplinking are mitigated in correlation with the reduction of localized subbands 304. It is to be appreciated that as distributed allocation of resources increases, the number of localized subbands 304 decreases while the number of subcarriers 306 within the localized subbands is preserved or remains within a certain range. It is also to be appreciated that as puncturing of the localized subbands 304 due to distributed allocations increases, the width of the frequency band occupied by each localized subband can increase. Therefore, frequency selectivity of the localized subbands 304 may be diminished.

With further reference to FIG. 3, information about the boundaries of the localized subbands 304 and spacing between distributed subcarriers must be conveyed to all scheduled users. Specific resource allocation is signaled on the control channel of each scheduled user and should include a subband identification, a starting point and spacing for distributed users, or starting point and number of tones for localized users. It is to be appreciated that depending on the type of subband ID that is allocated, each scheduled user would know if the transmission will be localized, distributed, or a multiplexed signal of both localized transmission and distributed transmission. Therefore, scheduled users would have knowledge regarding interpretation of an associated control channel.

Figure 4:
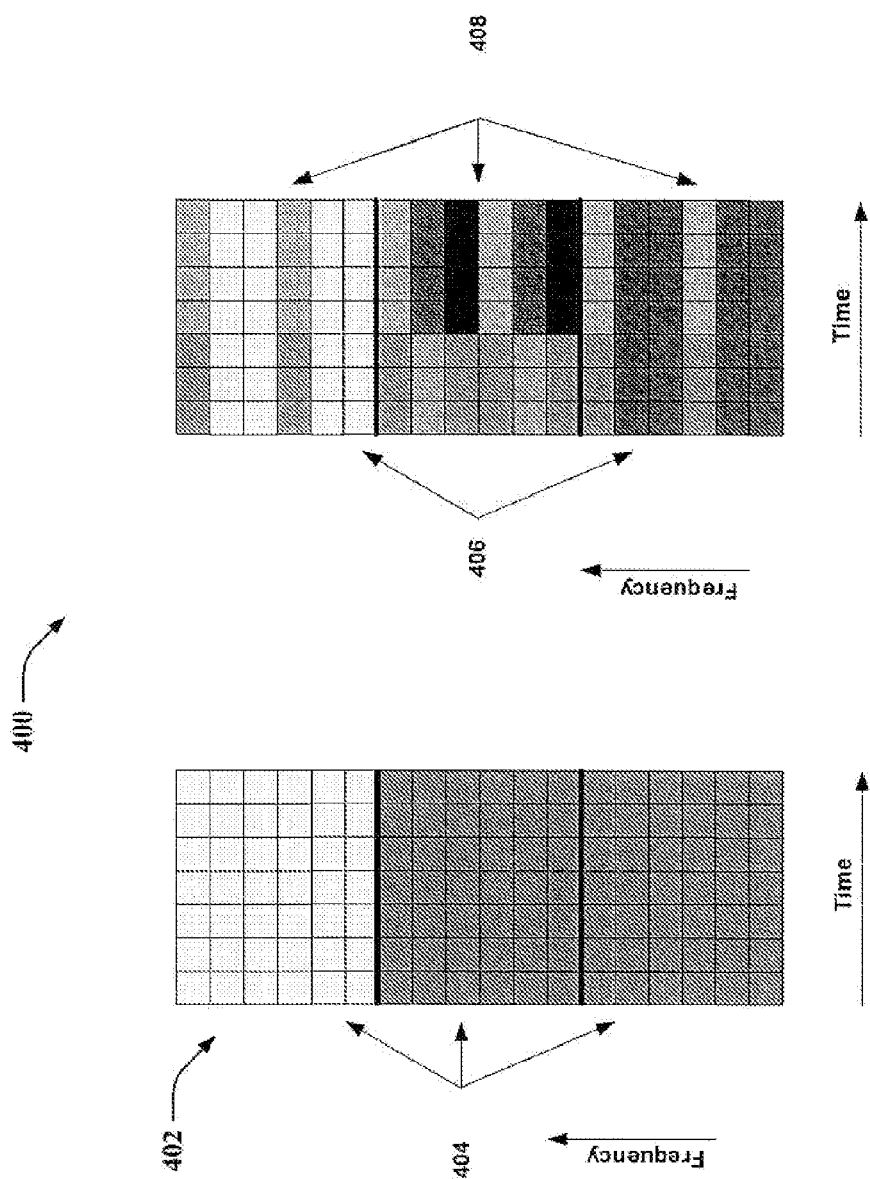
FIG. 4 is another illustration of an example scheme within a wireless communications environment.

Referring to FIG. 4, a multiplexing scheme 400 that is within a wireless communications environment is illustrated. Frequency band 402 is partitioned into localized subbands 404. In this embodiment, spacing of punctured distributed allocations 408 is specified for each localized subband 406. As a result, the sub-carriers can be non-uniformly punctured within the localized subbands 406. In addition, one or more localized subbands 406 can become distributed, which lowers the number of subbands 406 for which uplink quality feedback is needed. Moreover, as noted above with regard to FIG. 3, specific resource allocation is signaled on a control channel of each scheduled user. It is to be appreciated that distributed allocations are not uniformly distributed over the localized subbands 406. For example, multiplexing scheme 400 can include one localized subband that is all distributed, while surrounding localized subbands are localized with distributed puncturing of resources. While multiplexing scheme 400 provides for the frequency span of the localized subbands 406 to remain constant, the number of subcarriers within the localized subbands 406 may decrease as a result of puncturing of distributed allocations.

With regard to multiplexing schemes 300 and 400 as illustrated in FIGS. 3 and 4, respectively, when distributed allocations are significant, it is possible to lower the number of localized subbands, and therefore achieve channel quality overhead reduction during uplink. As an example, if four localized subbands exist, and the number of designated bits for subbands' channel quality is eight, then in case the number of designated bits for subbands' channel quality is eight, than in case the number of localized subbands is lowered to two, one would need only five bits to represent their channel quality (e.g. MCS index). On the other hand, if bandwidth overhead reduction is desired to be achieved rather than power reduction, the extra three bits can be used to improve the granularity of the channel quality feedback.

Figure 5:
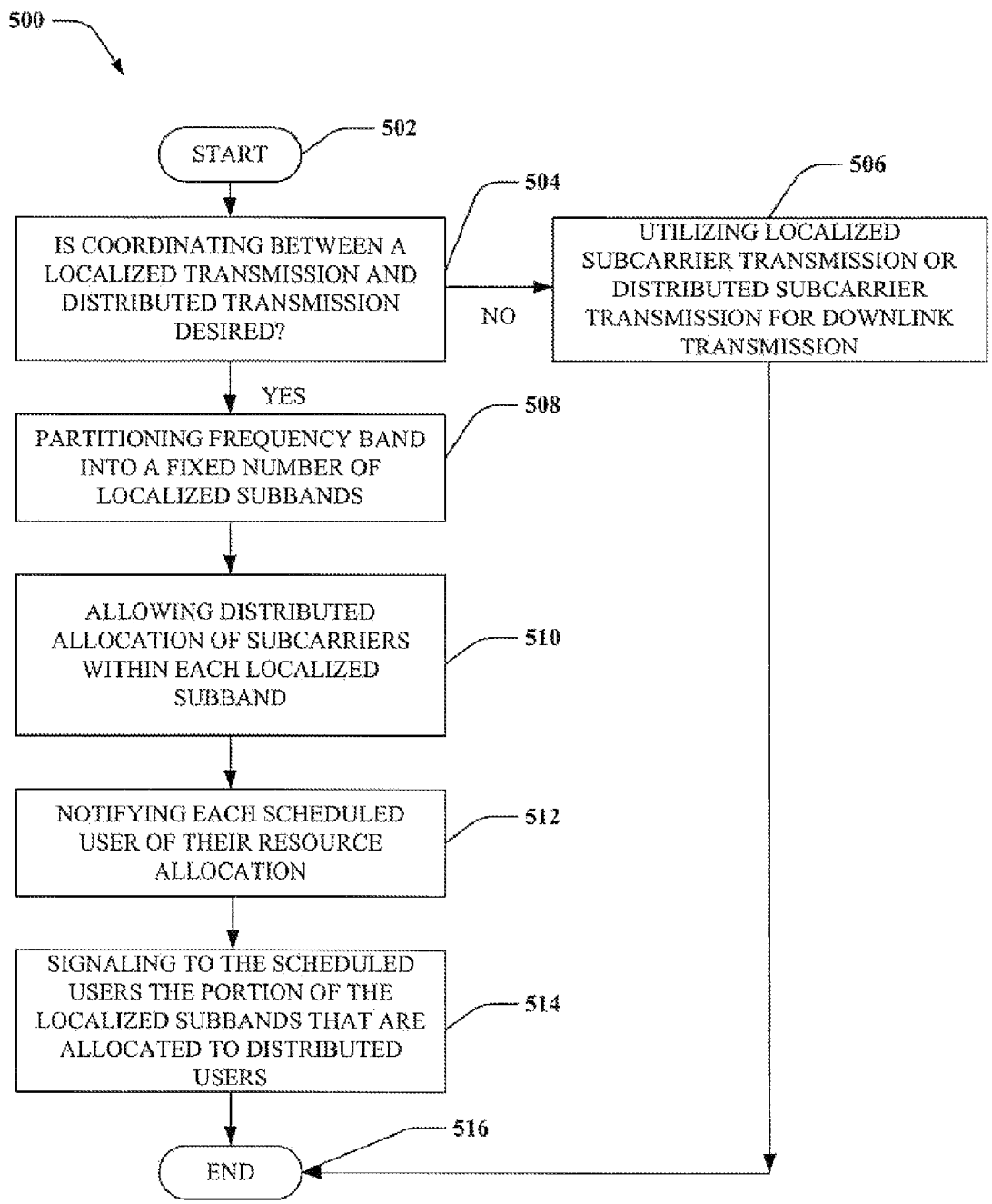
FIG. 5 is an illustration of an example methodology that facilitates a multiplexed downlink transmission in a wireless communications system.
Figure 6:
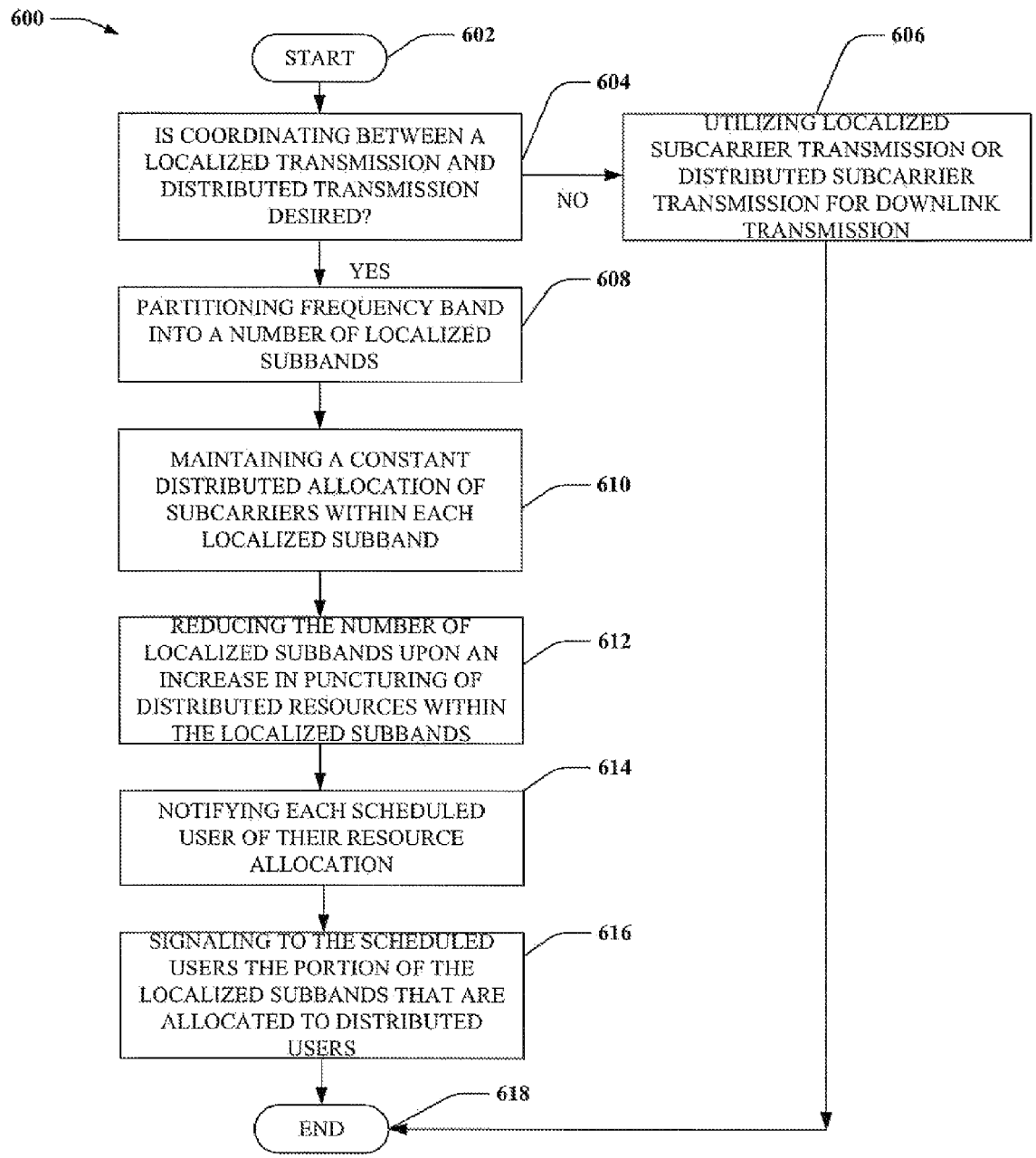
FIG. 6 is another illustration of an example methodology that facilitates a multiplexed downlink transmission in a wireless communications system.
Figure 7:
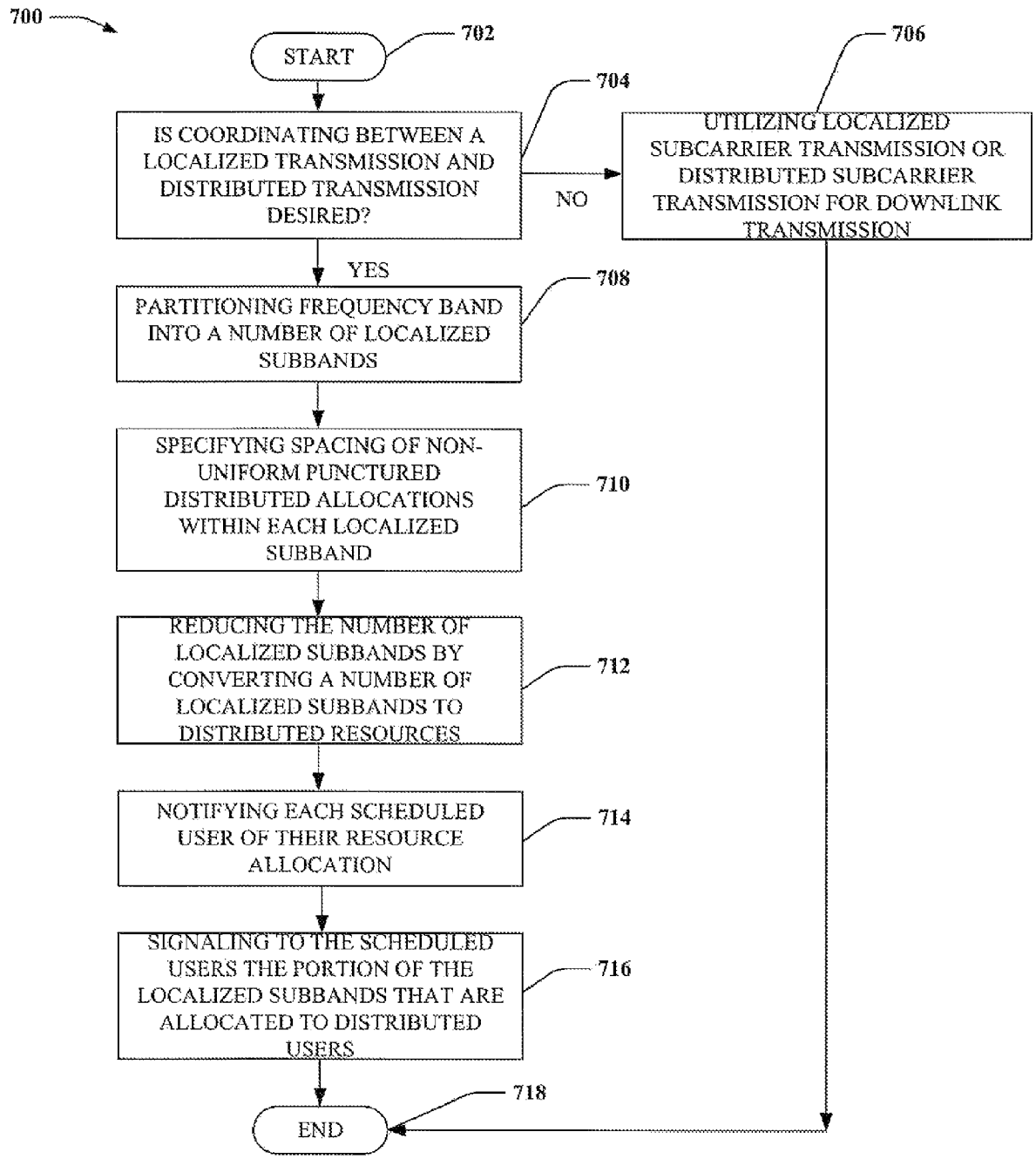
FIG. 7 is another illustration of an example methodology that facilitates a multiplexed downlink transmission in a wireless communications system.

Referring to FIGS. 5-7, methodologies relating to multiplexing localized transmissions and distributed transmissions is illustrated. While, for purposes of simplicity of explanation, the methodologies are shown and described as a series of acts, it is to be understood and appreciated that the methodologies are not limited by the order of acts, as some acts may, in accordance with the claimed subject matter, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the claimed subject matter.

Turning specifically to FIG. 5, a methodology 500 that facilitates a multiplexed downlink transmission in a wireless communications system is illustrated. The method starts at 502 and at 504, a determination is made as to whether a multiplexed transmission of localized transmission and distributed transmission is desired. Such a determination can be made, for example, based on traffic services, user abilities and channel properties. If multiplexing is not desired, the method moves to 506. At 506, one of localized transmission and distributed transmission is employed for the downlink transmission. If a multiplexed transmission is desired, the method moves to 508, where the frequency band is partitioned into a fixed number of localized subbands. At 510, distributed allocation of resources is allowed within each localized subband. At 512, each scheduled user is notified of their resource allocation, and at 514, the scheduler users receive a signal that indicates the portion of the localized subbands that are allocated to the distributed users.

With reference now to FIG. 6, an example methodology 500 that facilitates a multiplexed downlink transmission in a wireless communications system is illustrated. The method begins at 602 and at 604, a determination is made as to whether a multiplexed transmission of localized transmission and distributed transmission is desired. Such determination can be made, for example, based on traffic services, user abilities and channel properties. If multiplexing is not desired, the method proceeds to 606. At 606, one of localized transmission and distributed transmission is employed for the downlink transmission. If a multiplexed transmission is desired, the method proceeds to 608, where the frequency band is partitioned into a fixed number of localized subbands. At 610, a constant distributed allocation of subcarriers within each localized subband is maintained. At 612, a reduction in uplink overhead for subband quality reporting can be achieved an increase in puncturing of distributed resources within the localized subband occurs. Such reduction in uplink overhead occurs because of the corresponding reduction in the number of localized subbands due to the puncturing of distributed resources. At 614, each scheduled user is notified of their resource allocation, and at 616, the scheduler users receive a signal that indicates the portion of the localized subbands that are allocated to the distributed users.

Referring now to FIG. 7, a methodology 700 that facilitates a multiplexed downlink transmission in a wireless communications system is illustrated. The method begins at 702 and at 704, a determination is made as to whether a multiplexed transmission of localized transmission and distributed transmission is desired. Such determination can be made, for example, based on traffic services, user abilities and channel properties. If multiplexing is not desired, the method proceeds to 706. At 706, one of localized transmission and distributed transmission is employed for the downlink transmission. If a multiplexed transmission is desired, the method proceeds to 708, where the frequency band is partitioned into a fixed number of localized subbands. At 710, spacing for non-uniform punctured distributed allocations within each localized subband is specified. At 712, the number of localized subbands in the frequency band is reduced by converting a number of localized subbands to distributed resources. As a result, channel quality overhead reduction in the uplink is achieved. At 714, each scheduled user is notified of their resource allocation, and at 716, the scheduler users receive a signal that indicates the portion of the localized subbands that are allocated to the distributed users.

Figure 8:
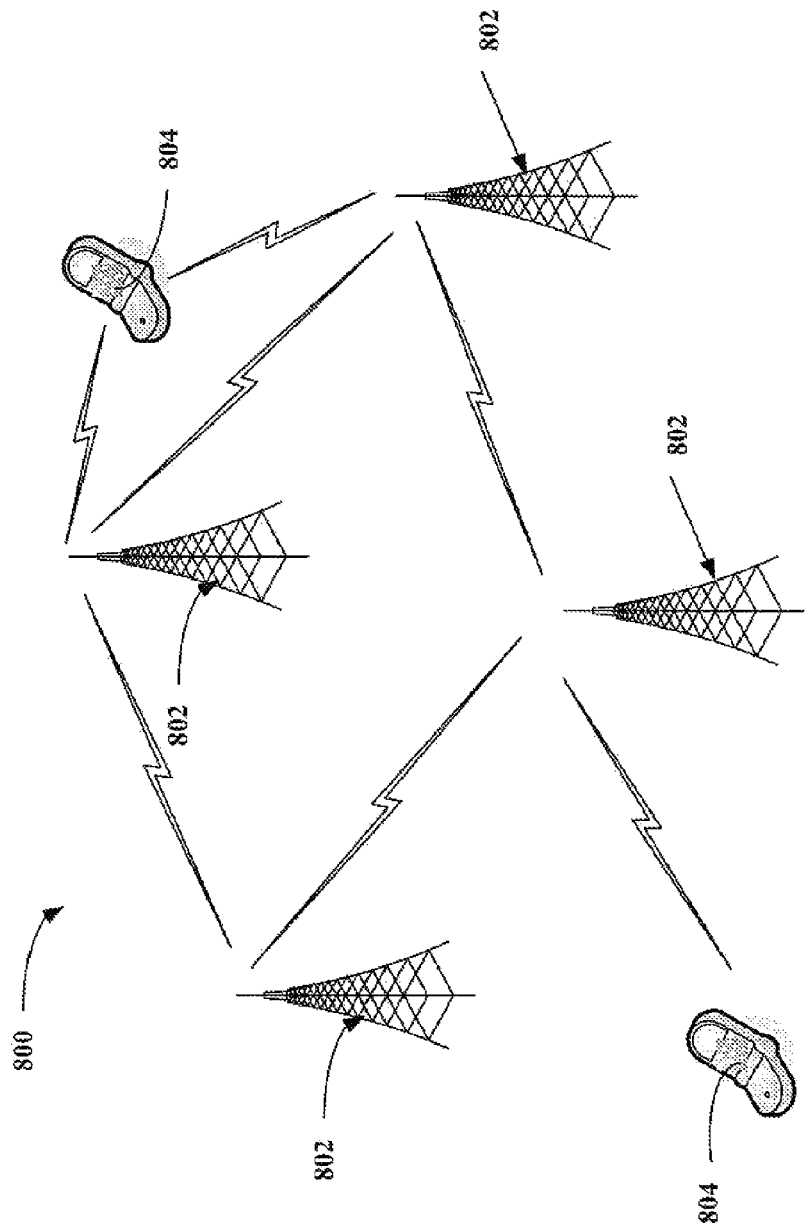
FIG. 8 is an illustration of a wireless communication system in accordance with various aspects set forth herein.

Referring now to FIG. 8, a wireless communication system 800 is illustrated in accordance with various embodiments presented herein. System 800 can comprise one or more base stations 802 (e.g., access points) in one or more sectors that receive, transmit, repeat, etc., wireless communication signals to each other and/or to one or more mobile devices 804.

Each base station 802 can comprise a transmitter chain and a receiver chain, each of which can in turn comprise a plurality of components associated with signal transmission and reception (e.g., processors, modulators, multiplexers, demodulators, demultiplexers, antennas, . . . ) as will be appreciated by one skilled in the art. Mobile devices 804 can be, for example, cellular phones, smart phones, laptops, handheld communication devices, handheld computing devices, satellite radios, global positioning systems, PDAs, and/or any other suitable device for communicating over wireless communication system 800.

Base stations 802 can broadcast content to mobile devices 804 by employing Forward Link Only (FLO) technology. For instance, real time audio and/or video signals may be broadcast, as well as non-real time services (e.g., music, weather, news summaries, traffic, financial information, . . . ). According to an example, content may be broadcast by base stations 102 to mobile devices 804. Mobile devices 804 may receive and output such content (e.g., by employing visual output(s), audio output(s), . . . ). Moreover, FLO technology may utilize orthogonal frequency division multiplexing (OFDM). Frequency division based techniques such as OFDM typically separate the frequency spectrum into distinct channels; for instance, the frequency spectrum may be split into uniform chunks of bandwidth. OFDM effectively partitions the overall system bandwidth into multiple orthogonal frequency channels. Additionally, an OFDM system may use time and/or frequency division multiplexing to achieve orthogonality among multiple data transmissions for multiple base stations 802.

In FLO systems, it is desirable to ensure that the mobile devices 804 are properly receiving data provided by the base stations 802. To that end, and as described in more detail below, the FLO Test Application Protocol (FTAP) can be employed to verify the physical layer of system 800. In other words, FTAP can be employed to ensure that the mobile devices 804 are receiving data from the base stations 802 properly. FTAP defines a set of procedures that, when implemented by both a network and the mobile devices 804, can be used for minimum performance tests with respect to the device. To that end, FTAP flows (a series of FTAP packets) can be configured and activated within a network to test specific device behaviors. Pursuant to one example, each FTP packet can carry information such as a test sequence number, a test signature, and a test data pattern. The sequence number can be a 32 bit integer that is derived from a 32 bit counter, wherein the counter can be initialized to any suitable value. It is understood, however, that the sequence number can be of any suitable number of bits, and the counter can be a counter of any suitable number of bits. The test signature can be an eight bit pseudo random integer derived from a circular buffer of bits generated through use of a particular polynomial, such as $p(x)=x^{15}+x+1$ and a 15-state Simple Shift Register Generator (SSRG). Again, however, the polynomial and the Simple Shift Register Generator can differ, and it is understood that suitable variances from the SSRG and the polynomial are contemplated and intended to fall under the scope of the hereto-appended claims.

Verification of data that accords to FTAP can be performed on the mobile devices 804. For example, if test data is generated using a well known algorithm, then the mobile devices 104 can implement a substantially similar algorithm to verify whether the received data is correct. Verification performed on the mobile devices is fairly simple and enables real-time reporting (e.g., the mobile devices 804 can report errors over a 1x link or any other suitable link). To enable this verification, the mobile devices 104 should know a state of the FTAP flows. Furthermore, the devices 104 should account for erasures or loss of coverage as well as wraparounds.

Figure 9:
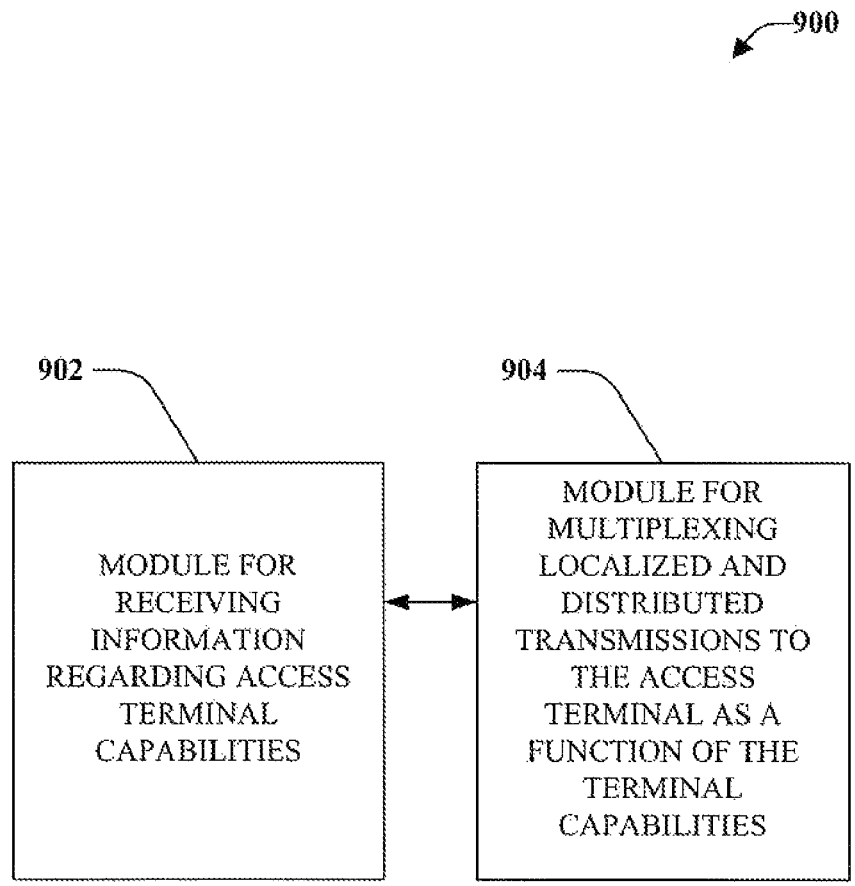
FIG. 9 is a block diagram of a system that facilitates a multiplexed downlink transmission according to mobile device capabilities.

Referring now to FIG. 9, a system 900 that facilitates optimal downlink transmission is illustrated. System 900 can include a module 902 for receiving information regarding access terminal capabilities. In particular, for example, system 900 can accommodate various traffic services, user abilities and further allows a user of one or more mobile devices to take advantage of channel properties. System 900 can also include a module 904 for multiplexing localized and distributed transmissions to the access terminal as a function of the terminal capabilities. Module 904 can select an optimal scheme for multiplexing in accordance with terminal capabilities at a given time.

Figure 10:
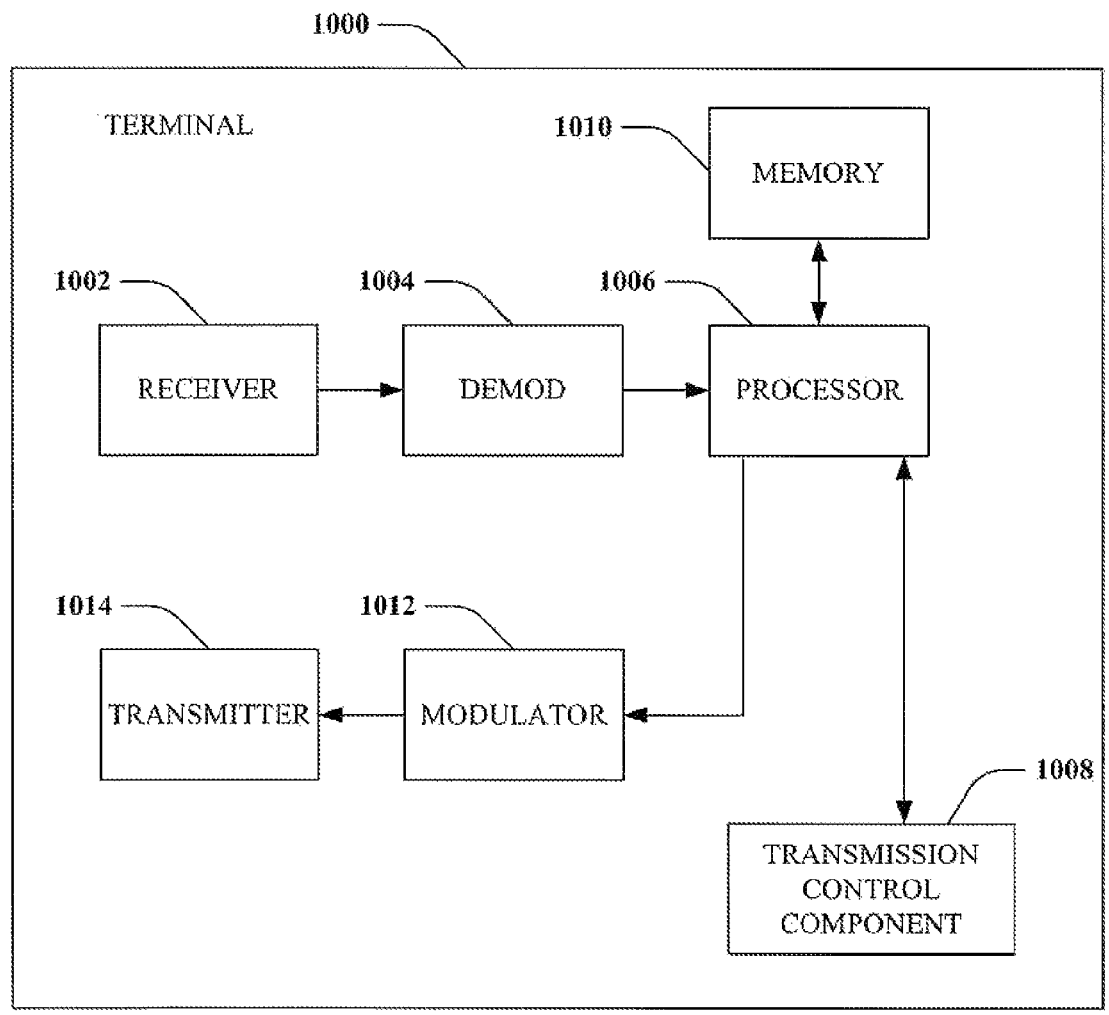
FIG. 10 illustrates a system that provides for other sector communication in accordance with one or more aspects presented herein.

FIG. 10 is an illustration of a terminal or user device 1000 that provides for other sector communication in a wireless communication environment in accordance with one or more aspects set forth herein. Terminal 1000 comprises a receiver 1002 that receives a signal, for instance one or more receive antennas, and performs typical actions (e.g., filters, amplifies, downconverts, etc.) the received signal and digitizes the conditioned signal to obtain samples. A demodulator 1004 can demodulate the samples and provide received pilot symbols to a processor 1006.

Processor 1006 can be a processor dedicated to analyzing information received by receiver component 1002 and/or generating information for transmission by a transmitter 1014. Processor 1006 can be a processor that controls one or more components of terminal 1000, and/or a processor that analyzes information received by receiver 1002, generates information for transmission by a transmitter 1014, and controls one or more components of terminal 1000. Processor 1006 can utilize any of the methodologies described herein, including those described with respect to FIGS. 5-7.

In addition, terminal 1000 can include a transmission control component 1008 that analyzes received input, including acknowledgements of successful transmissions. Acknowledgements (ACK) can be received from the serving sector and/or a neighboring sector. Acknowledgements can indicate that a previous transmission has been successfully received and decoded by one of the access points. If no acknowledgement is received, or if a negative acknowledgement (NAK) is received, the transmission can be resent. Transmission control component 1008 can be incorporated into the processor 1006. It is to be appreciated that transmission control component 1008 can include transmission control code that performs analysis in connection with determining receipt of acknowledgement.

Terminal 1000 can additionally comprise memory 1010 that is operatively coupled to processor 1006 and that can store information related to transmissions, an active set of sectors, methods for controlling transmissions, lookup tables comprising information related thereto, and any other suitable information related to transmissions and active set sectors as described herein. It will be appreciated that the data store (e.g., memories) components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 1010 of the subject systems and methods is intended to comprise, without being limited to, these and any other suitable types of memory. Processor 1006 is connected to a symbol modulator 1012 and transmitter 1014 that transmits the modulated signal.

Figure 11:
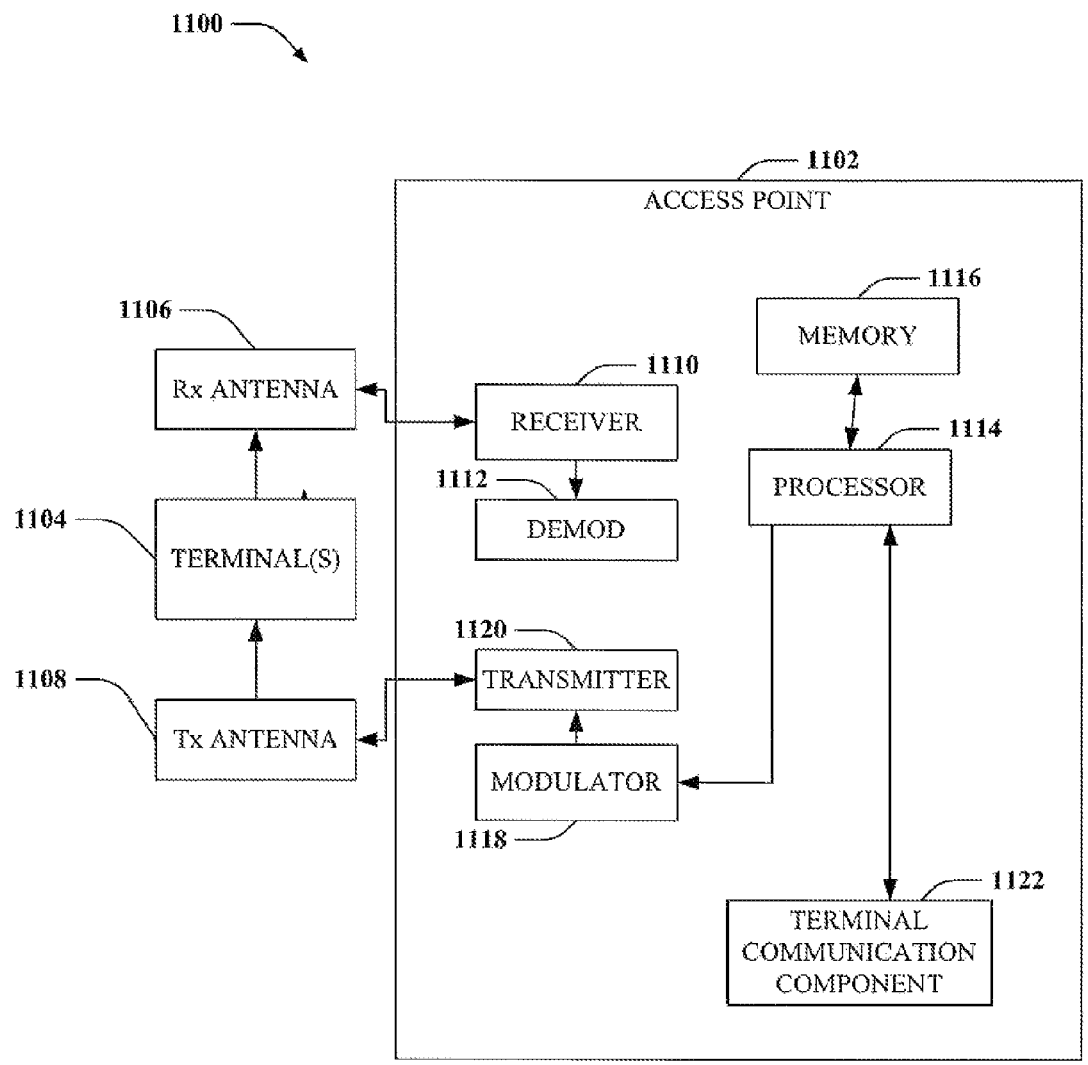
FIG. 11 illustrates a system that provides for processing reverse link communications at a non-serving sector of a terminal in accordance with one or more aspects presented herein.

FIG. 11 is an illustration of a system 1100 that facilitates other sector communication in a communication environment in accordance with various aspects. System 1100 comprises an access point 1102 with a receiver 1110 that receives signal(s) from one or more terminals 1104 through one or more receive antennas 1106, and transmits to the one or more terminals 1104 through a plurality of transmit antennas 1108. Terminals 1104 can include those terminals supported by the access point 1102, as well as terminals 1104 supported by neighboring sectors. In one or more aspects, receive antennas 1106 and transmit antennas 1108 can be implemented using a single set of antennas. Receiver 1110 can receive information from receive antennas 1106 and is operatively associated with a demodulator 1112 that demodulates received information. Receiver 1110 can be, for example, a Rake receiver (e.g., a technique that individually processes multi-path signal components using a plurality of baseband correlators, . . . ), an MMSE-based receiver, or some other suitable receiver for separating out terminals assigned thereto, as will be appreciated by one skilled in the art. According to various aspects, multiple receivers can be employed (e.g., one per receive antenna), and such receivers can communicate with each other to provide improved estimates of user data. Demodulated symbols are analyzed by a processor 1114 that is similar to the processor described above with regard to FIG. 10, and is coupled to a memory 1116 that stores information related to terminals, assigned resources associated with terminals and the like. Receiver output for each antenna can be jointly processed by receiver 1110 and/or processor 1114. A modulator 1118 can multiplex the signal for transmission by a transmitter 1120 through transmit antennas 1108 to terminals 1104.

Access point 1102 further comprises a terminal communication component 1122, which can be a processor distinct from, or integral to, processor 1114. Terminal communication component 1122 can obtain resource assignment information for terminals supported by neighboring sectors. In addition, terminal communication component 1122 can provide assignment information to neighboring sectors for terminals supported by access point 1102. Assignment information can be provided via backhaul signaling.

Based upon information regarding assigned resources, terminal communication component 1122 can direct detection of transmissions from terminals supported by neighboring sectors, as well as decoding of received transmissions. Memory 1116 can maintain packets received from terminals prior to receipt of the assignment information necessary for decoding of packets. Terminal communication component 1122 can also control transmission and receipt of acknowledgments indicating successful reception and decoding of transmissions. It is to be appreciated that terminal communication component 1122 can include transmission analysis code that performs utility based control in connection with assigning resources, identifying terminals for soft handoff, decoding transmissions and the like. The terminal analysis code can utilize artificial intelligence based methods in connection with performing inference and/or probabilistic determinations and/or statistical-based determinations in connection with optimizing terminal performance.

Figure 12:
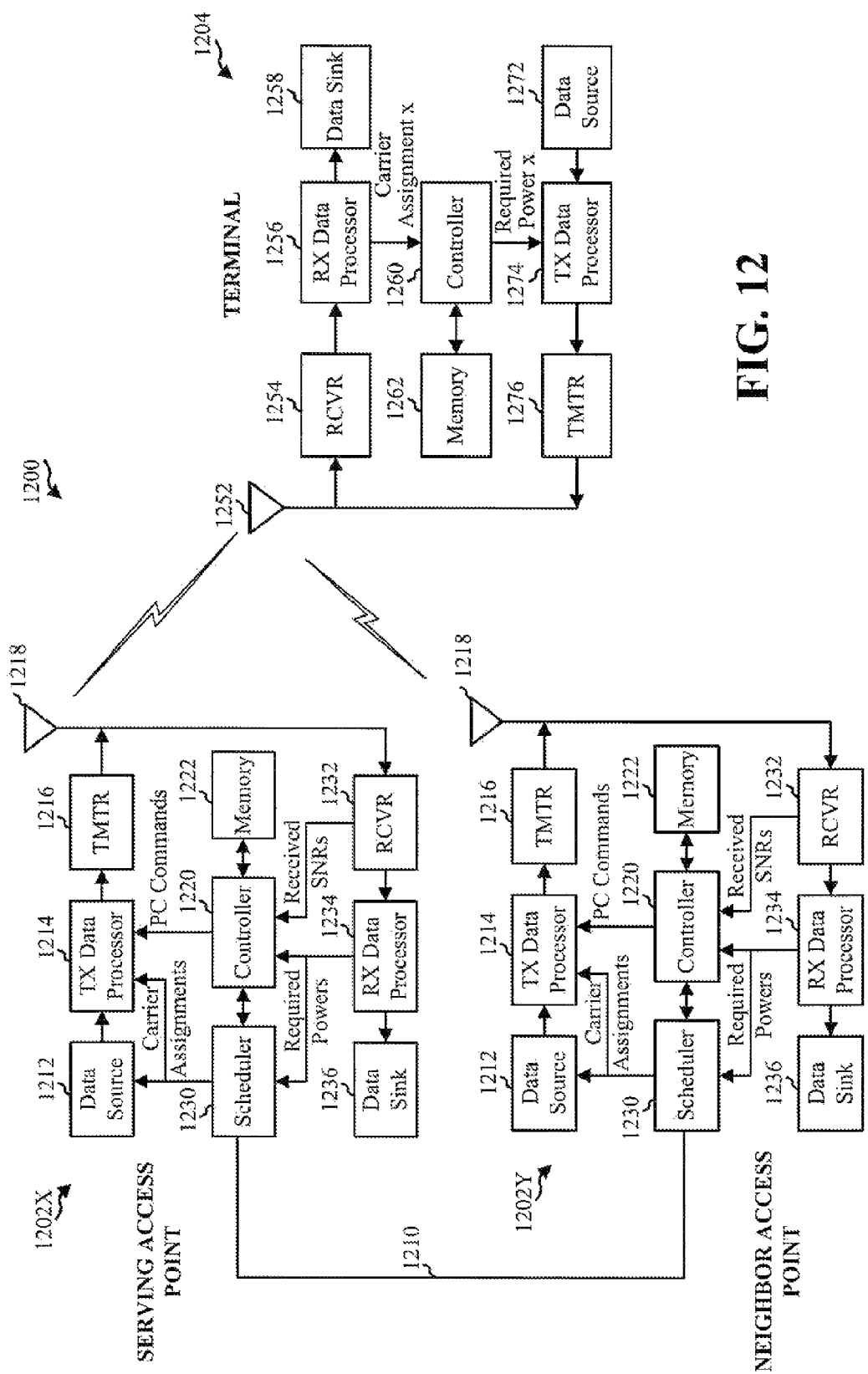
FIG. 12 is an illustration of a wireless communication environment that can be employed in conjunction with the various systems and methods described herein.

FIG. 12 shows an exemplary wireless communication system 1200. The wireless communication system 1000 depicts one terminal and two access points for sake of brevity. However, it is to be appreciated that the system can include one or more access point and/or more than one terminal, wherein additional access points and/or terminals can be substantially similar or different from the exemplary access points and terminal described below. In addition, it is to be appreciated that the access points and/or the terminal can employ the systems (FIGS. 1-4 and 8-11) and/or methods (FIGS. 5-7) described herein.

FIG. 12 shows a block diagram of a terminal 1204, a serving access point 1202X point that supports terminal 1024 and a neighbor access point 1202Y in multiple-access multi-carrier communication system 1200. At access point 1202X, a transmit (TX) data processor 1214 receives traffic data (i.e., information bits) from a data source 1212 and signaling and other information from a controller 1220 and a scheduler 1230. For example, scheduler 1230 may provide assignments of carriers for the terminals. Additionally, a memory 1222 can maintain information regarding current or previous assignments. TX data processor 1214 encodes and modulates the received data using multi-carrier modulation (e.g., OFDM) to provide modulated data (e.g., OFDM symbols). A transmitter unit (TMTR) 1216 then processes the modulated data to generate a downlink modulated signal that is then transmitted from an antenna 1218.

Prior to transmission of assignment information to terminal 1204, scheduler can provide assignment information to access point 1202Y. The assignment information can be provided via backhaul signaling (e.g., a T1 line) 1210. Alternatively, assignment information can be provided to access point 1202Y after transmission to terminal 1204.

At terminal 1204, the transmitted and modulated signal is received by an antenna 1252 and provided to a receiver unit (RCVR) 1254. Receiver unit 1254 processes and digitizes the received signal to provide samples. A received (RX) data processor 1256 then demodulates and decodes the samples to provide decoded data, which may include recovered traffic data, messages, signaling, and so on. The traffic data may be provided to a data sink 1258, and the carrier assignment information for the terminal 1204 is provided to a controller 1260.

Controller 1260 directs data transmission on the uplink using the specific carriers that have been assigned to terminal 1204 and indicated in the received carrier assignment. A memory 1262 can maintain information regarding assigned resources (e.g., frequency, time and/or code) and other related information.

For terminal 1204, a TX data processor 1274 receives traffic data from a data source 1272 and signaling and other information from controller 1260. The various types of data are coded and modulated by TX data processor 1274 using the assigned carriers and further processed by a transmitter unit 1276 to generate an uplink modulated signal that is then transmitted from antenna 1252.

At access points 1202X and 1202Y, the transmitted and modulated signals from terminal 1204 are received by antenna 1218, processed by a receiver unit 1232, and demodulated and decoded by an RX data processor 1234. Transmitted signals can be decoded based upon assignment information generated by serving access point 1202X and provided to neighbor access point 1202Y. In addition, access points 1202X and 1202Y can generate an acknowledgement (ACK) that can be provided to the other access point (1202X or 1202Y) and/or to terminal 1204. The decoded signals can be provided to a data sink 1236. Receiver unit 1232 may estimate the received signal quality (e.g., the received signal-to-noise ratio (SNR)) for each terminal and provide this information to controller 1220. RX data processor 1234 provides the recovered feedback information for each terminal to controller 1220 and scheduler 1230.

Scheduler 1230 uses the feedback information to perform a number of functions such as (1) selecting a set of terminals for data transmission on the reverse link and (2) assigning carriers to the selected terminals. The carrier assignments for the scheduled terminals are then transmitted on the forward link to these terminals.

The techniques described herein may be implemented by various means. For example, these techniques may be implemented in hardware, software, or a combination thereof. For a hardware implementation, the processing units (e.g., controllers 1220 and 1260, TX and RX processors 1214 and 1234, and so on) for these techniques may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

For a software implementation, the techniques described herein may be implemented with modules (e.g., procedures, functions, and so on) that perform the functions described herein. The software codes may be stored in memory units and executed by processors. The memory unit may be implemented within the processor or external to the processor, in which case it can be communicatively coupled to the processor via various means as is known in the art.

What has been described above includes examples of one or more aspects. It is, of course, not possible to describe every conceivable combination of components or methodologies for purposes of describing the aforementioned aspects, but one of ordinary skill in the art may recognize that many further combinations and permutations of various aspects are possible. Accordingly, the described aspects are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method of wireless communication, comprising:
   receiving information regarding access terminal capabilities; and
   multiplexing localized and distributed transmissions in a communication to the access terminal on a downlink channel, the multiplexing performed as a function of the capabilities,
   wherein distributed allocation is performed as needed amongst subcarriers within localized subbands and wherein the multiplexing facilitates optimized frequency diversity by notifying scheduled users of their respective sub-carrier allocation.

2. The method of claim 1, wherein the multiplexing is a function of an estimate of conditions on the downlink channel.

3. The method of claim 1, wherein the multiplexing is a function of subscriber data.

4. The method of claim 1, wherein the multiplexing is a function of a ratio of high speed versus low speed users.

5. The method of claim 1, wherein the multiplexing is a function of subscriber data.

6. The method of claim 1, further comprising signaling the scheduled users of a portion of resources that have been allocated to distributed allocation users.

7. The method of claim 1, wherein a number of localized subbands that make up a frequency band remains constant, regardless of a number of distributed allocations that are present.

8. The method of claim 1, wherein the multiplexing is based on reducing number of subcarriers as distributed allocation of resources increases.

9. The method of claim 1, wherein the multiplexing is based on reducing a number of localized subbands in a whole frequency band.

10. The method of claim 9, wherein as distributed allocation of resources increases, the number of localized subbands decreases while number of subcarriers within localized subbands is preserved and remains within a certain range.

11. The method of claim 9, further comprising conveying information about boundaries of the localized subbands and spacing between distributed subcarriers to scheduled users.

12. The method of claim 11, wherein specific resource allocation is signaled on respective control channels of each scheduled user and includes a subband identification, a starting point and spacing for distributed users, or starting point and number of tones for localized users.

13. The method of claim 12 further comprising allocating a type of subband ID to inform each respective scheduled user whether a transmission will be localized, distributed, or a multiplexed signal of both localized transmission and distributed transmission so that the scheduled users have knowledge regarding interpretation of an associated control channel.

14. The method of claim 1, wherein a frequency band is partitioned into localized subbands, and spacing of punctured distributed allocations is specified for each localized subband.

15. The method of claim 14, wherein one or more localized subbands is distributed so as to lower a number of subbands for which uplink quality feedback is needed.

16. The method of claim 15, wherein specific resource allocation is signaled on a control channel of respective scheduled users.

17. The method of claim 16, wherein distributed allocations are not uniformly distributed over the localized subbands.

18. The method of claim 17, wherein the multiplexing includes one or more localized subbands that are all distributed, while surrounding localized subbands are one of localized with distributed puncturing of resources and localized without distributed puncturing of resources.

19. The method of claim 18, wherein the multiplexing provides for a frequency span of the localized subbands to remain constant.

20. The method of claim 1, wherein when distributed allocations are significant, a number of localized subbands is lowered to facilitate achieving channel quality overhead reduction during uplink.

21. The method of claim 20, wherein if bandwidth overhead reduction is desired to be achieved rather than power reduction, extra three bits can be employed to improve granularity of channel quality feedback.

22. An apparatus, comprising:
   a memory for storing information;
   a processor that executes instructions; and
   an optimization component that receives information regarding access terminal capabilities, and multiplexes localized and distributed transmissions in a communication to the access terminal on a downlink channel, the multiplexing performed as a function of the capabilities,
wherein distributed allocation is performed as needed amongst subcarriers within localized subbands and wherein the multiplexing facilitates optimized frequency diversity by notifying scheduled users of their respective sub-carrier allocation.

23. The apparatus of claim 22, wherein the optimization component performs the multiplexing as a function of an estimate of conditions on the downlink channel.

24. The apparatus of claim 22, wherein the optimization component performs the multiplexing as a function of subscriber data.

25. The apparatus of claim 22, wherein the optimization component performs the multiplexing as a function of ratio of high speed versus low speed users.

26. The apparatus of claim 22, wherein the optimization component performs the multiplexing as a function of reducing a number of localized subbands in a whole frequency band.

27. A non-transitory computer readable medium having stored thereon computer executable instructions for performing the following acts:
receiving information regarding access terminal capabilities; and
multiplexing localized and distributed transmissions in a communication to the access terminal on a downlink channel, the multiplexing performed as a function of the capabilities,
wherein distributed allocation is performed as needed amongst subcarriers within localized subbands and wherein the multiplexing facilitates optimized frequency diversity by notifying scheduled users of their respective sub-carrier allocation.

28. The non-transitory computer readable medium of claim 27, having stored thereon instructions for multiplexing as a function of an estimate of conditions on the downlink channel.

29. The non-transitory computer readable medium of claim 27, having stored thereon instructions for multiplexing as a function of subscriber data.

30. The non-transitory computer readable medium of claim 27, having stored thereon instructions for multiplexing as a function of ratio of high speed versus low speed users.

31. The non-transitory computer readable medium of claim 27, having stored thereon instructions for signaling scheduled users of a portion of resources that have been allocated to distributed allocation users.

32. The non-transitory computer readable medium of claim 27, having stored thereon instructions for multiplexing as a function of reducing number of subcarriers as distributed allocation of resources increases.

33. The non-transitory computer readable medium of claim 27, having stored thereon instructions for multiplexing based on reducing a number of localized subbands in a whole frequency band.

34. The non-transitory computer readable medium of claim 27, having stored thereon instructions for conveying information about boundaries of the localized subbands and spacing between distributed subcarriers to scheduled users.

35. The non-transitory computer readable medium of claim 34, having stored thereon instructions for allocating a type of subband ID to inform each respective scheduled user whether a transmission will be localized, distributed, or a multiplexed signal of both localized transmission and distributed transmission so that the scheduled users have knowledge regarding interpretation of an associated control channel.

36. A processor having stored thereon computer executable instructions for performing the following acts:
receiving information regarding access terminal capabilities; and
multiplexing localized and distributed transmissions in a communication to the access terminal on a downlink channel, the multiplexing performed as a function of the capabilities,
wherein distributed allocation is performed as needed amongst subcarriers within localized subbands and wherein the multiplexing facilitates optimized frequency diversity by notifying scheduled users of their respective sub-carrier allocation.

37. The processor of claim 36, having stored thereon instructions for multiplexing as a function of an estimate of conditions on the downlink channel.

38. The processor of claim 36, having stored thereon instructions for multiplexing as a function of subscriber data.

39. The processor of claim 36, having stored thereon instructions for multiplexing as a function of ratio of high speed versus low speed users.

40. The processor of claim 36, having stored thereon instructions for multiplexing as a function of subscriber data.

41. The processor of claim 36, having stored thereon instructions for signaling scheduled users of a portion of resources that have been allocated to distributed allocation users.

42. The processor of claim 36, having stored thereon instructions for multiplexing as a function of reducing number of subcarriers as distributed allocation of resources increases.

43. The processor of claim 36, having stored thereon instructions for multiplexing based on reducing a number of localized subbands in a whole frequency band.

44. The processor of claim 36, having stored thereon instructions for conveying information about boundaries of the localized subbands and spacing between distributed subcarriers to scheduled users.

45. The processor of claim 44, having stored thereon instructions for allocating a type of subband ID to inform each respective scheduled user whether a transmission will be localized, distributed, or a multiplexed signal of both localized transmission and distributed transmission so that the scheduled users have knowledge regarding interpretation of an associated control channel.

46. An apparatus, comprising:
means for receiving information regarding access terminal capabilities; and
means for multiplexing localized and distributed transmissions in a communication to the access terminal on a downlink channel, the multiplexing performed as a function of the capabilities,
wherein distributed allocation is performed as needed amongst subcarriers within localized subbands and wherein the multiplexing facilitates optimized frequency diversity by notifying scheduled users of their respective sub-carrier allocation.

47. A method of communicating on a downlink channel in a wireless communication system, comprising:
receiving information regarding high speed capabilities and low speed capabilities of a plurality of access terminals in the wireless communication system; and
optimizing the downlink channel by multiplexing localized transmissions to one or more of the plurality of access terminals associated with the low speed capabilities and distributed transmissions to one or more others of the plurality of access terminals associated with high speed capabilities in a communication to the plurality of access terminals on the downlink channel, the multiplexing changing as a number of the plurality of access terminals associated with the high speed capabilities increases, wherein distributed allocation is performed as needed amongst subcarriers within localized subbands and wherein the multiplexing facilitates optimized frequency diversity by notifying scheduled users of their respective sub-carrier allocation.

48. The method of claim 47, wherein the multiplexing includes allocating fixed subbands in the downlink channel, the fixed subbands including subcarriers, and allocating at least one of the fixed subbands for the distributed transmissions.

* * * * *